Sept. 8, 1964
D. R. HASSELL ETAL
3,147,781
POLE FORMING MACHINE
Filed Feb. 12, 1962
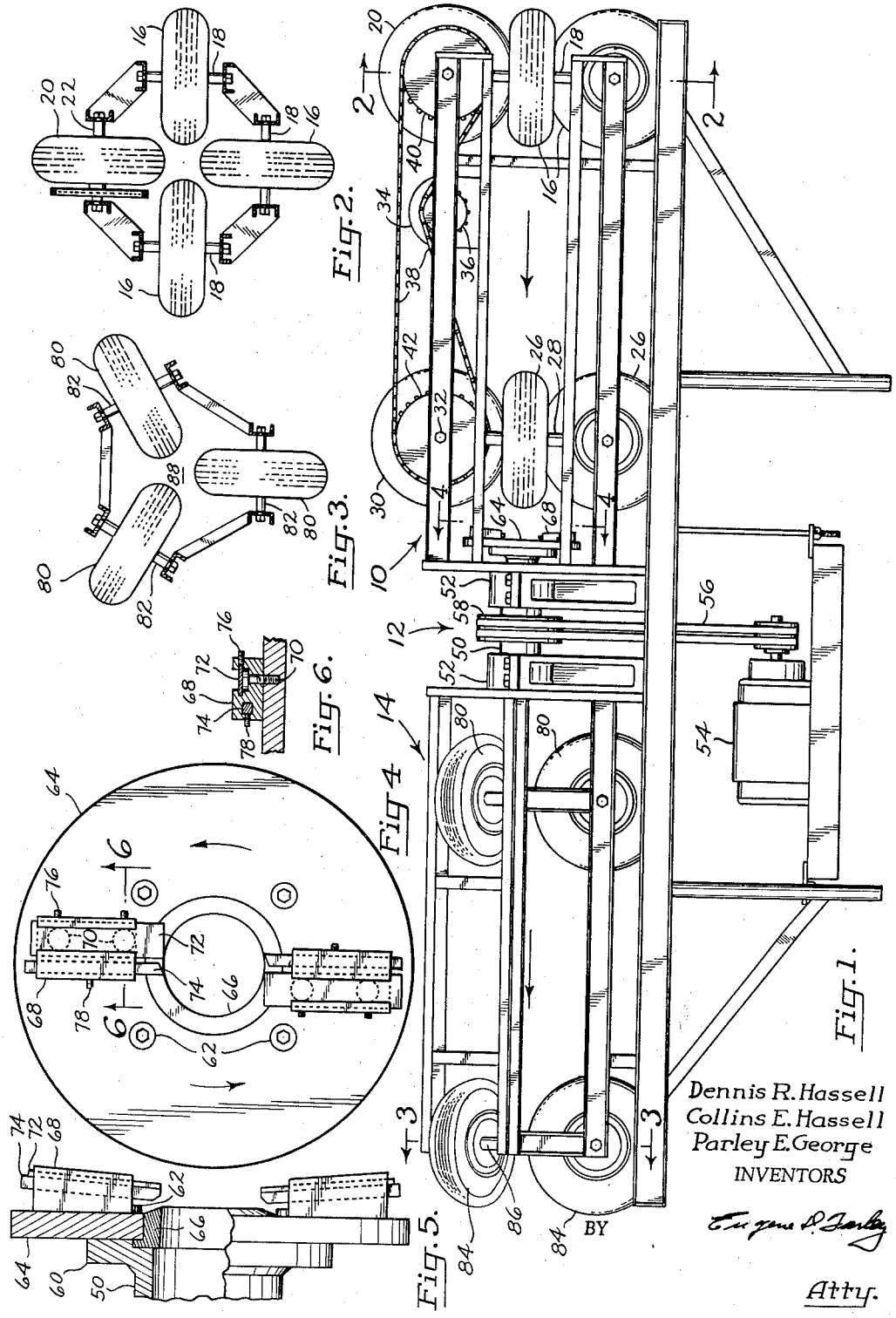
Dennis R. Hassell
Collins E. Hassell
Parley E. George
INVENTORS
BY Eugene D. Farley
Atty.

United States Patent Office 3,147,781 ciently so that they are substantially aligned with the bore of burnishing collar 66. Hence, as the logs are reduced to poles of the selected diameter, they are passed first through the burnishing collar, which imparts a smooth surface to them, then through the bore of hollow shaft 50, and then to the outfeed pole guiding unit 14.

*The Outfeed Pole Guiding Unit*

The construction of outfeed pole guiding unit 14 preferably is similar to that of infeed guiding and driving unit 10. As illustrated in FIGS. 1 and 3, it is mounted on a common frame with the other units of the apparatus and includes a plurality of rotatably mounted wheels, preferably arranged in spaced groups. All of the wheels of the unit may be idler wheels, and three wheels per cluster is an adequate number.

Thus there may be provided a forwardly located group of wheels 80 rotatably mounted on shafts 82. Similarly there may be provided a rearwardly located group of wheels 84 rotatably mounted on shafts 86. The wheels of each group are equidistant from each other, i.e. at an angle of 120°, and are positioned radially with respect to the pole. They are separated from each other by a distance sufficient to form openings 88 which are aligned not only with the bore of hollow drive shaft 50 but also with openings 24 created by the wheels of the log driving and guiding unit.

Like the latter, the wheels of outfeed pole guiding unit 24 are provided with resilient surfaces which grip the finished pole. Preferably they comprise wheel assemblies including pneumatic tires which are inflated resiliently and accordingly grip the poles effectively.

*Operation*

The operation of the herein described pole forming apparatus is as follows:

Rough logs are converted to finished poles by passing them through the apparatus from right to left, as viewed in FIG. 1. Drive wheels 20, 30 of the infeed log guiding and driving unit 10, are driven by motor 36 at a speed correlated with the rotational speed of cutting unit 12.

The logs are fed endwise into openings 24 between tires 16, 20 of the upstream wheel group and thence are passed through the corresponding opening formed by wheels 26, 30 of the downfeed wheel group. Since these wheels carry resiliently inflated pneumatic tires, they can pass the logs in spite of rough, irregular surfaces, and a certain amount of bowing.

The logs are passed through unit 10 in end abutting relationship, one pushing the other, entering in turn hollow shaft 50 of cutting unit 12. Rossing elements 72 of the cutting units remove the bark and score the log surface sufficiently so that the log can be reduced easily to the selected size by the action of cutters 74.

The log thus is reduced to a diameter which can enter the bore of burnishing collar 66. The rapid rotating motion of this member of the assembly burnishes and finishes the surface of the pole.

The finished pole then passes through the bore of hollow drive shaft 50 and into outfeed guide unit 14.

Like the infeed guide and drive unit 10, the outfeed guide unit is comprised of a plurality of spaced groups of wheels forming openings 88 which are aligned with hollow shaft 50 and with openings 24 formed by the wheels of the guide and drive unit. Accordingly, from start to finish of the operation, the logs are maintained in precisely aligned arrangement with the consequent rapid production of burnished poles of uniform diameter.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described our invention, we claim:
Pole forming apparatus comprising, in combination:
(a) a log guiding and driving unit operable to receive rough logs and drive them endwise in abutting relation to each other while securing them against axial rotation and comprising
 (1) a plurality of longitudinally spaced groups of resiliently surfaced gripping wheels mounted for rotation in planes substantially parallel to the axis of log movement, the wheels in each group being arranged radially with respect to the axis of log movement for peripheral surface contact with a log,
 (2) drive means coupled to at least one of the wheels for driving the same in the log feed direction,
(b) a cutting unit positioned adjacent the outfeed of the log guiding and driving unit for receiving the logs therefrom and comprising
 (1) an annular tool support mounted adjacent the outfeed of the log guiding and driving unit for rotation on an axis substantially coaxial with the axis of log movement through the log guiding and driving unit, the passageway through the annular tool support being dimensioned to pass the finished poles,
 (2) guide means on the tool support slidably mounting rossing and cutting tools for adjustment relative to the passageway through the tool support and for rotating the rossing and cutting tools about the rotational axis of the tool support, the rossing tool being arranged to lead the cutting tool in the direction of rotation of the tool support for rossing the log surface preliminary to operation of the cutting tool,
 (3) securing means associated with the guide means for securing the tools in predetermined degrees of extension with reference to said passageway,
 (4) a burnishing collar secured to the tool support for rotation therewith and arranged substantially coaxial with the passageway through the tool support adjacent the cutting and rossing tools on the outfeed side thereof,
 (5) drive means operatively coupled to the tool support for rotating the latter at a selected speed,
(c) and a pole guiding unit adjacent the outfeed of the cutting unit for receiving the poles and guiding them away and comprising
 (1) a plurality of longitudinally spaced groups of resiliently surfaced gripping wheels mounted for rotation in planes substantially parallel to the axis of log movement through the cutting unit, the wheels in each group being arranged radially with respect to the axis of pole movement for peripheral surface contact with a pole being fed outwardly from the cutting unit.

References Cited in the file of this patent

UNITED STATES PATENTS

| | | |
|---|---|---|
| 430,144 | Palmer | June 17, 1890 |
| 456,317 | Snyder | July 21, 1891 |
| 1,676,738 | Lotterman et al. | July 10, 1928 |
| 2,109,414 | Deiters et al. | Feb. 22, 1938 |
| 2,448,689 | Schnyder | Sept. 7, 1948 |
| 2,581,479 | Grasham | Jan. 8, 1952 |
| 2,645,253 | Wilson | July 14, 1953 |
| 2,918,952 | Searle | Dec. 29, 1959 |
| 2,925,107 | Fitzwater | Feb. 16, 1960 |

FOREIGN PATENTS

| | | |
|---|---|---|
| 335,782 | Germany | Sept. 28, 1921 |
| 115,698 | Sweden | Jan. 22, 1946 |